(12) United States Patent
Pinkelman et al.

(10) Patent No.: US 10,532,672 B1
(45) Date of Patent: Jan. 14, 2020

(54) ADJUSTABLE FIRMNESS SEAT SUSPENSION AND SEAT INCORPORATING THE SAME

(71) Applicant: Toyota Motor Engineering & Manufacturing North America, Inc., Plano, TX (US)

(72) Inventors: Brian J. Pinkelman, Ann Arbor, MI (US); Umesh N. Gandhi, Farmington Hills, MI (US); Ryohei Tsuruta, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/026,522

(22) Filed: Jul. 3, 2018

(51) Int. Cl.
*B60N 2/50* (2006.01)
*B60N 2/54* (2006.01)

(52) U.S. Cl.
CPC .............. *B60N 2/501* (2013.01); *B60N 2/504* (2013.01); *B60N 2/54* (2013.01)

(58) Field of Classification Search
CPC ........ B60N 2/501; B60N 2/502; B60N 2/503; B60N 2/504; B60N 2/54
See application file for complete search history.

(56) References Cited

U.S. PATENT DOCUMENTS

| | | | |
|---|---|---|---|
| 7,758,121 B2 | 7/2010 | Browne et al. | |
| 7,905,547 B2 | 3/2011 | Lawall et al. | |
| 7,909,403 B2 | 3/2011 | Lawall et al. | |
| 8,100,471 B2 | 1/2012 | Lawall et al. | |
| 2005/0023086 A1 | 2/2005 | Szilagyi | |
| 2005/0253425 A1 | 11/2005 | Asada et al. | |
| 2007/0084220 A1 | 4/2007 | Asada et al. | |
| 2009/0224584 A1 | 9/2009 | Lawall et al. | |
| 2012/0319445 A1 | 12/2012 | Zolno et al. | |
| 2017/0252260 A1 | 9/2017 | Gummin et al. | |

FOREIGN PATENT DOCUMENTS

DE 102010021902 B4 4/2014

*Primary Examiner* — Philip F Gabler

(74) *Attorney, Agent, or Firm* — Christopher G. Darrow; Darrow Mustafa PC

(57) ABSTRACT

An adjustable firmness seat suspension includes a seat frame, first and second spring members, and an intermediate tensioning member. The seat frame includes a first frame member and a second frame member spaced apart from and opposite one another. The first spring member is attached to the first frame member, the second spring member is attached to the second frame member, and the intermediate tensioning member is attached to and extends between the first spring member and the second spring member. The intermediate tensioning member is formed from a shape memory alloy (SMA) having a first length that provides a first spring tension of the seat suspension through the first and second spring members, and configured to alter its length to a second length that provides a second spring tension of the seat suspension through the first and second spring members in response to application of a tensioning signal thereto.

20 Claims, 5 Drawing Sheets

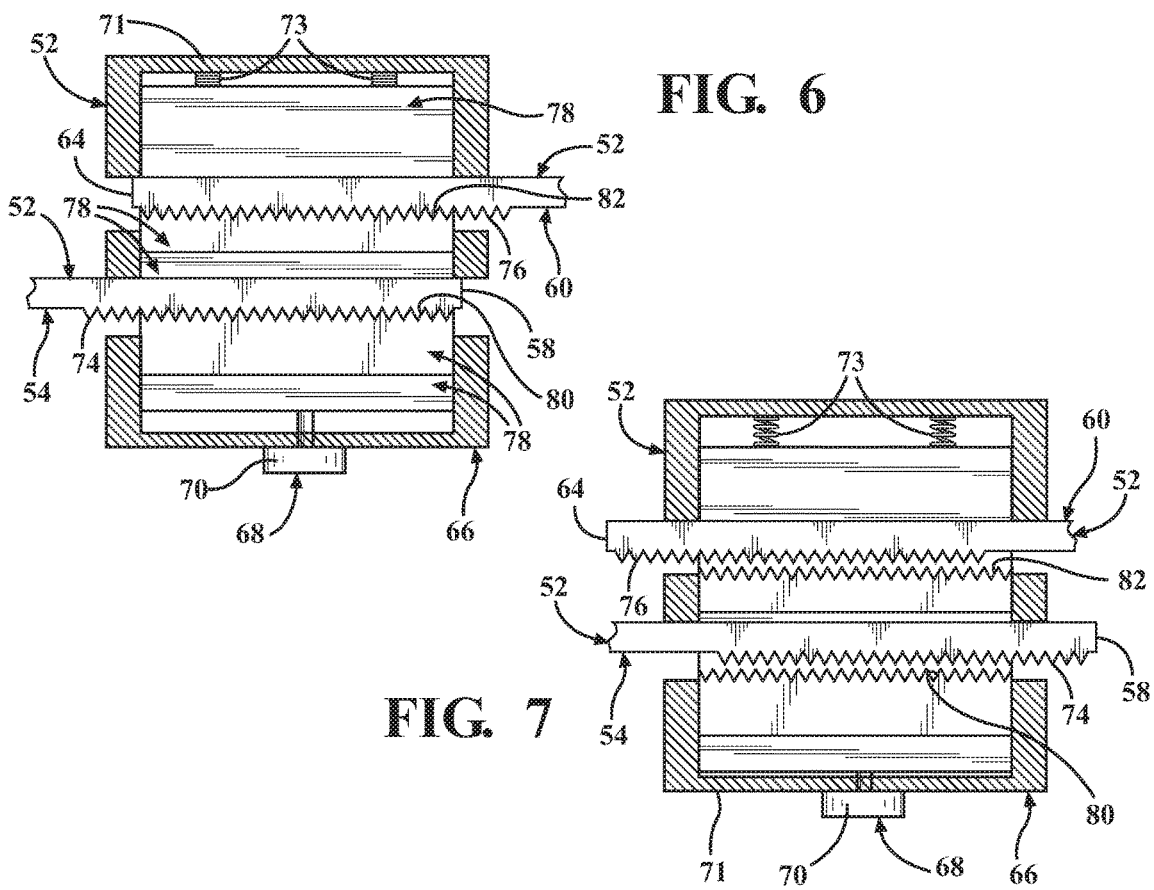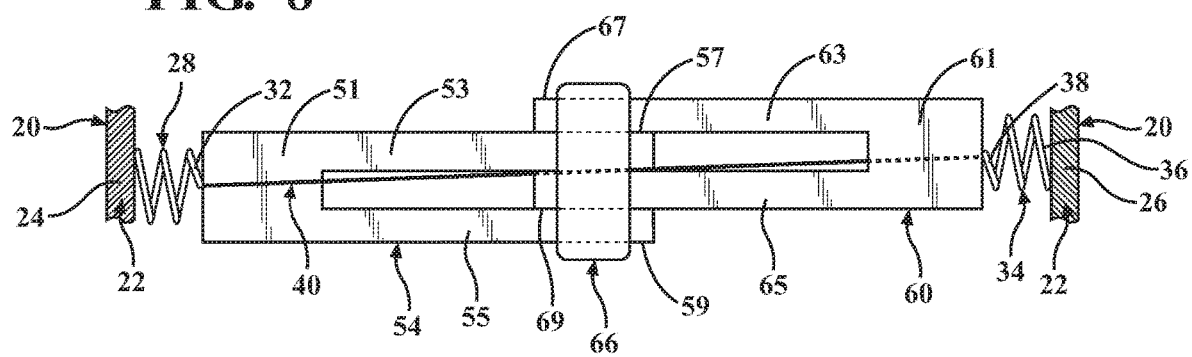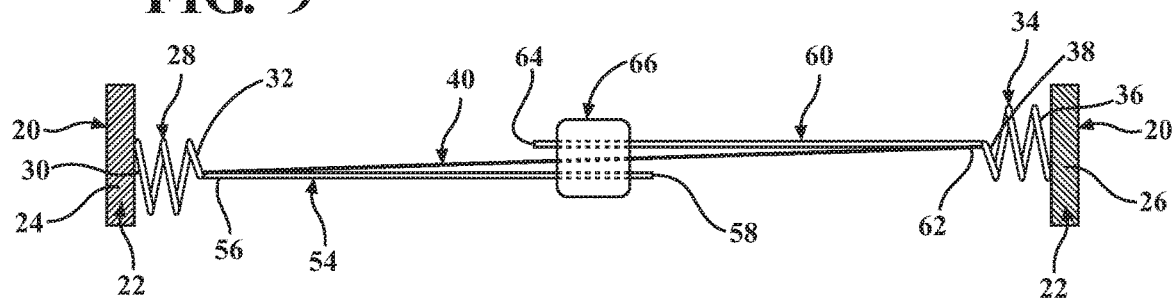

US 10,532,672 B1

ADJUSTABLE FIRMNESS SEAT SUSPENSION AND SEAT INCORPORATING THE SAME

FIELD OF THE INVENTION

The embodiments disclosed herein relate generally to an adjustable firmness seat suspension and a seat having the same and, more particularly, to an adjustable firmness vehicle seat suspension and a vehicle seat having the same.

BACKGROUND

Various forms of seats, particularly vehicle seats used in various types of motive vehicles, incorporate seat suspensions in both the seat base (i.e. the portion that contacts the lower body of a user, including the legs) and seat back (i.e. the portion that contacts the upper body of a user, including the back, arms, neck, and head) to support the weight of a user, such as a vehicle operator or passenger. The users can have significant differences, including, for example, different weights and weight distributions, body types, shapes (e.g. male and female), and sizes (e.g. overall heights and widths, as well as leg, arm, neck, and head sizes). It is frequently desirable to provide adjustable seats, particularly seats with adjustable seat suspensions in the seat base and seat back, to accommodate these differences and provide a comfortable seat for the user.

Various approaches have been employed to provide adjustable seats, including those that provide heating and cooling elements, adjust the back support (e.g. lumbar regions), adjust the thigh support (e.g. various adjustable side and seat bolsters), and change the size of the seat. These seats have included adjustable seat suspensions that incorporate various inflatable elements, such as air bladders, as well as those that incorporate certain shape memory alloy (SMA) elements.

Notwithstanding the existence of prior adjustable seat suspensions and seats that incorporate them, different users may find seats and seat suspension systems either too firm (too hard) or not firm enough (too soft) for their liking. Therefore, there remains a need for new adjustable firmness seat suspensions and seats incorporating them that are configured to provide improved degrees or levels of firmness that better satisfy user requirements and/or that provide a lower cost.

SUMMARY OF THE INVENTION

In one embodiment, an adjustable firmness seat suspension is disclosed. The adjustable firmness seat suspension includes a seat frame, first and second spring members, and an intermediate tensioning member. The seat frame includes a first frame member and a second frame member spaced apart from and opposite one another. The first spring member is attached to the first frame member, the second spring member is attached to the second frame member, and the intermediate tensioning member is attached to and extends between the first spring member and the second spring member. The intermediate tensioning member is formed from a shape memory alloy (SMA) having a first length that provides a first spring tension of the seat suspension through the first and second spring members, and configured to alter its length to a second length that provides a second spring tension of the seat suspension through the first and second spring members in response to application of a tensioning signal thereto.

In another embodiment, a vehicle seat is disclosed. The seat includes a seat base, seat back, or both, and includes an adjustable firmness seat suspension. The adjustable firmness seat suspension includes a seat frame, a plurality of first spring members, a plurality of second spring members, and a plurality of intermediate tensioning members. The seat frame includes a first frame member and a second frame member spaced apart from and opposite one another. The first spring members are attached to the first frame member, the second spring members are attached to the second frame member, and the intermediate tensioning members are each attached to and extend between a respective pair of first and second spring members. Each intermediate tensioning member is formed from a shape memory alloy (SMA) having a first length that provides at least part of a first spring tension of the seat suspension, and configured to alter its length to a second length that provides at least part of a second spring tension of the seat suspension in response to application of a tensioning signal thereto. The seat also includes a user seat cushion disposed over the seat suspension between the first frame member and the second frame member. The seat further includes a seat cover disposed over the user seat cushion and the seat suspension.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 6 is a schematic section view of the embodiment of FIG. 5 taken along Section 6--6 in a locked condition;

FIG. 7 is a schematic section view of the embodiment of FIG. 6 in an unlocked condition;

FIG. 8 is a schematic top section view of a third embodiment of an adjustable firmness seat suspension, as disclosed herein;

FIG. 9 is a schematic front section view of the embodiment of FIG. 8;

DESCRIPTION OF THE EMBODIMENTS

Figure 1:
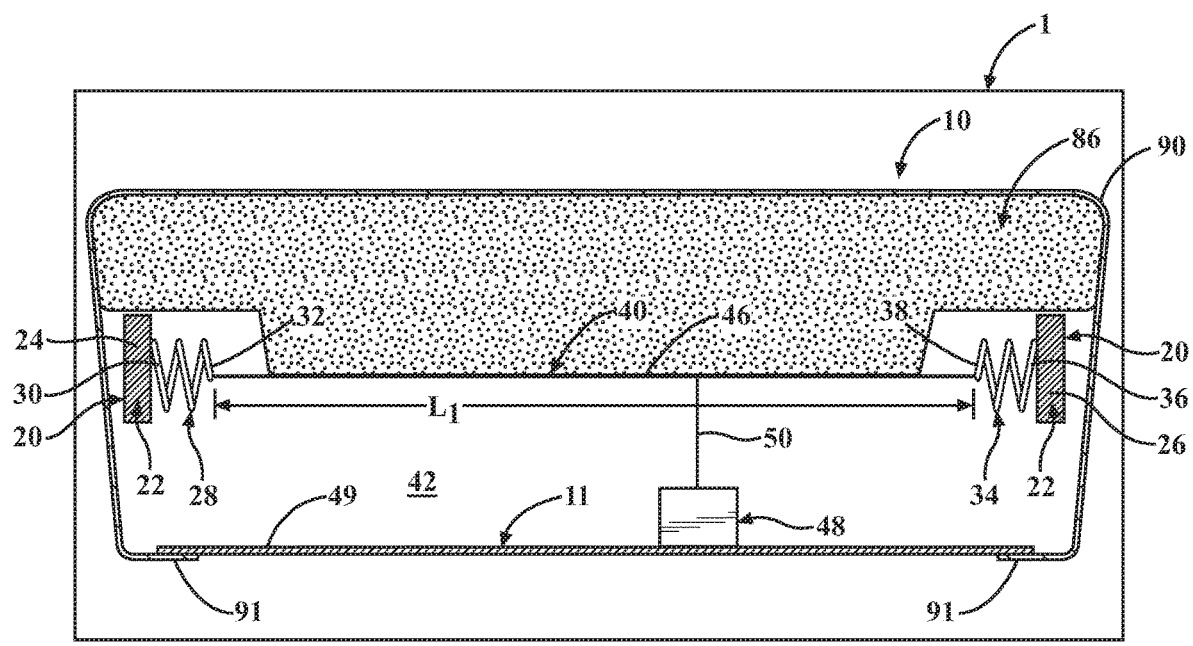
FIG. 1 is a schematic section view of an embodiment of an adjustable firmness seat suspension in a first tension condition and a seat that includes the seat suspension, as disclosed herein.

An adjustable firmness seat suspension and a seat incorporating the same are disclosed. The firmness of the seat suspension is also sometimes referred to in the art as the relative hardness or softness of the seat suspension. The seat suspension utilizes a shape memory alloy (SMA), such as nitinol, to adjust or vary the firmness of the seat suspension. For example, the seat suspension may utilize an SMA member, such as an SMA wire, that is mounted by its respective ends to a pair of spring members, such as coil springs, which in turn are mounted to a seat frame. The SMA member and spring members are disposed in tension within the seat frame to provide a first or base spring tension. The SMA member may be deformed in tension, either prior to or during its installation, to a first length that is greater than an initial length. With the SMA member at its first length, the first spring tension may then be adjusted by the application of an electrical current to heat the SMA member by, for example, resistive heating and thereby cause a phase change within the SMA member that causes the SMA member to revert to or otherwise toward its initial length, thereby decreasing in length and changing (i.e. increasing) the spring tension of the seat suspension to a second spring tension. Thus, adjusting the current adjusts the length of the SMA member, which in turn adjusts the spring tension and the firmness (hardness/softness) of the seat suspension. The current may be applied by a controller configured to variably control the current signal continuously over a predetermined range of currents, thereby providing a predetermined range of spring tensions and firmness levels within the seat suspension.

The seat suspension, and a seat incorporating the seat suspension, may also incorporate a locking mechanism to lock/unlock the seat suspension at any predetermined tension level that the SMA member and spring members are capable of achieving, and may incorporate an actuator to lock/unlock the locking mechanism. The locking mechanism may also be in signal communication with the controller and configured to lock/unlock the seat suspension based on a lock/unlock signal from the controller in conjunction with the tension adjustment. Thus, for example, the seat suspension may be unlocked in conjunction with a tensioning signal to change the spring tension to another level, and then relocked at the new spring tension, which may be higher or lower than the original spring tension. The seat suspension may be combined with cushion elements and a seat cover and used in a seat base, seat back, or both, to provide an adjustable firmness seat. These seats may be used in any seating application. For example, these seats may be used in all manner of motive vehicle seats, including those for land, marine, and aircraft or space vehicle applications, and particularly seats for automobiles, including all manner of cars and light-duty, medium-duty, and heavy-duty trucks.

As used herein, the terms front or forward or rear or rearward or aft refer to the front or rear of the article or vehicle, or to a direction toward the front or rear of the article or vehicle, respectively. The terms longitudinal or along the length refer to a direction that extends along an article or vehicle centerline between the front and the rear. The terms lateral or along the width or left-right refer to a direction that is orthogonal, or substantially orthogonal, to the longitudinal direction. The terms up or upward or down or downward refer to the top or bottom of the article or vehicle, or to a direction substantially toward the top or bottom of the article or vehicle, respectively. The terms in or inner or inward refer to a direction toward the center of the article (e.g. the seat or the seat suspension between a seat frame's frame members) or vehicle, and out or outer or outward refer to the opposite direction away from the center or central portion of the article (e.g. the seat or the seat suspension) or vehicle.

Figure 2:
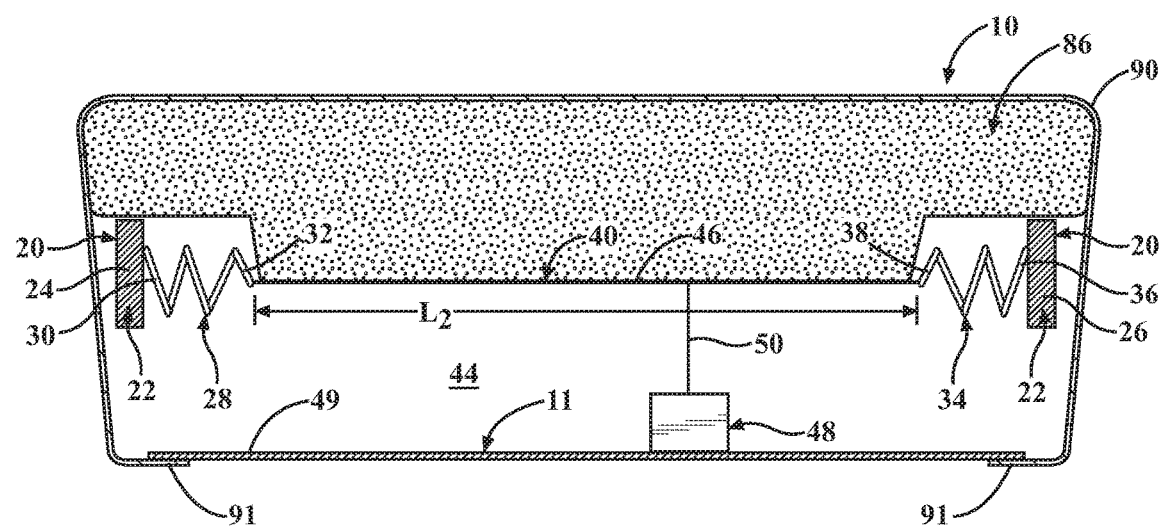
FIG. 2 is a schematic section view of the seat suspension of FIG. 1 in a second tension condition that is greater than the first tension condition.

Referring to FIGS. 1-12 generally, and more particularly to FIGS. 1-2, in one embodiment an adjustable firmness seat suspension 20 for an adjustable firmness seat 10 is disclosed. The seat 10 may comprise any manner of fixed or movable seat, including a seat for a motive vehicle 1, such as a land, marine, and aircraft or space vehicle, and particularly a seat, or a plurality of seats, for automobiles, including all manner of cars and light-duty, medium-duty, and heavy-duty trucks.

Figure 10:
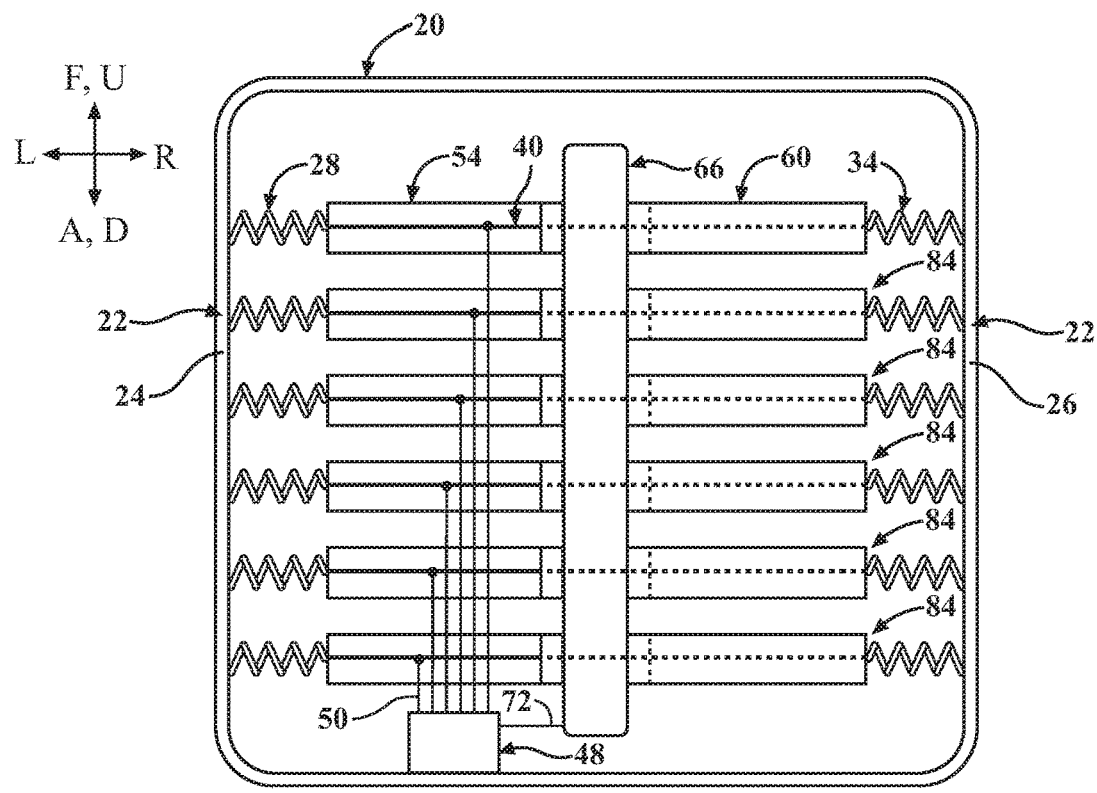
FIG. 10 is a schematic top view of a fourth embodiment of an adjustable firmness seat suspension, as disclosed herein.
Figure 11:
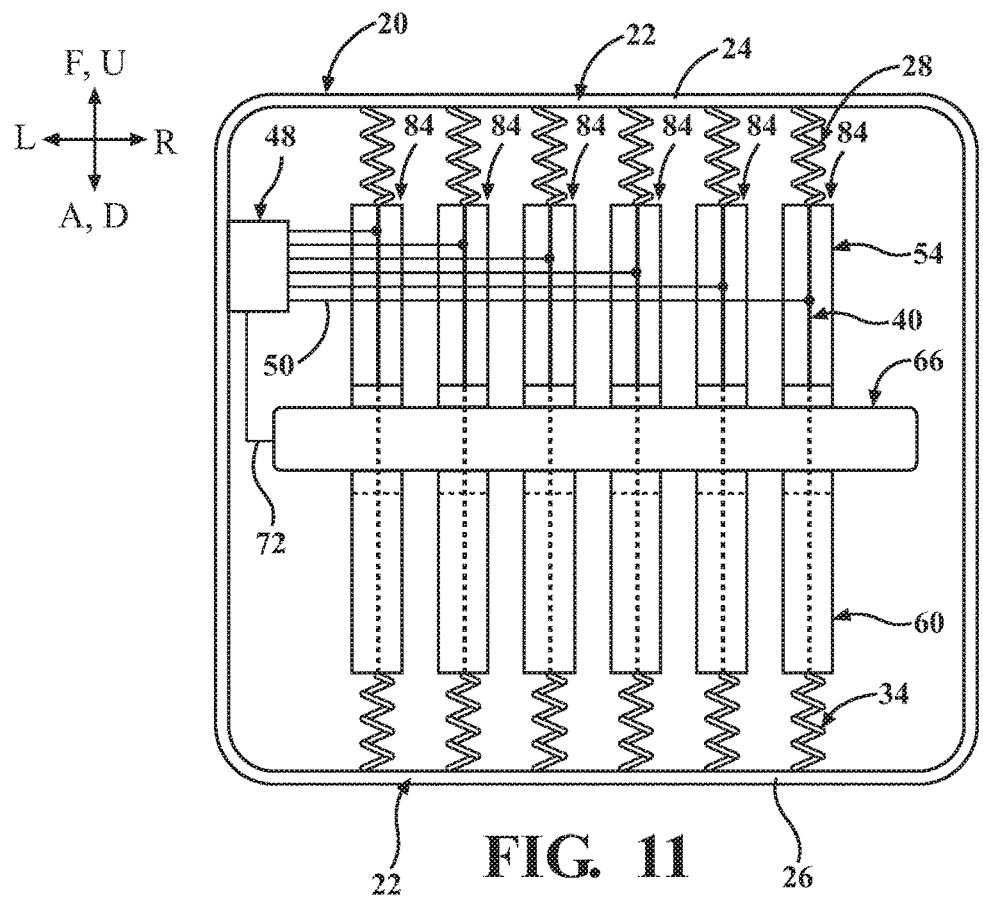
FIG. 11 is a schematic top view of a fifth embodiment of an adjustable firmness seat suspension, as disclosed herein.
Figure 12:
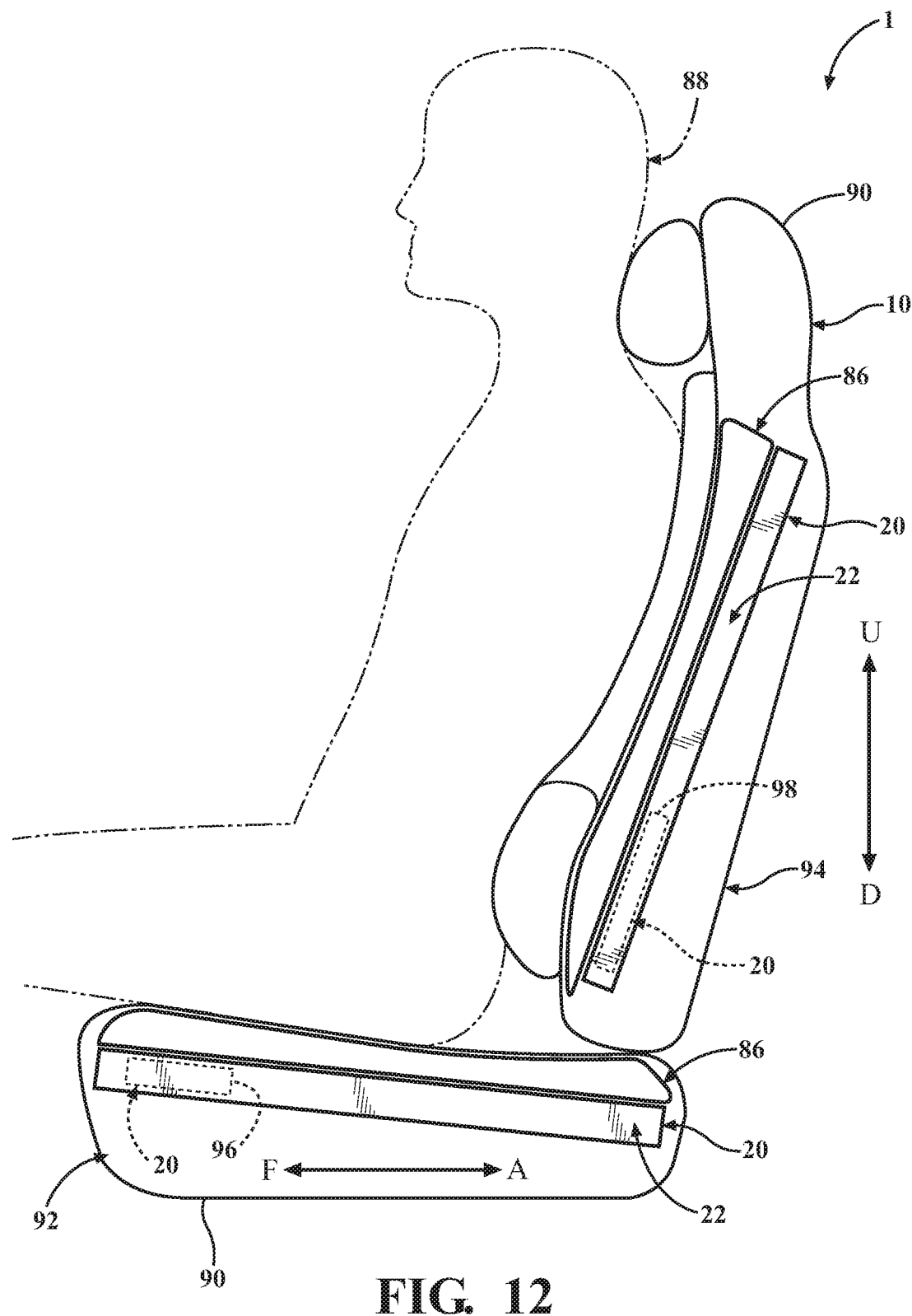
FIG. 12 is a schematic section view of a sixth embodiment of an adjustable firmness seat suspension and a seat that includes the seat suspension, as disclosed herein.

The seat suspension 20 includes a seat frame 22. The seat frame 22 includes a first frame member 24 and a second frame member 26 that is spaced apart from and opposite the first frame member 24, and extending in a direction substantially the same as, and including a direction that is the same as, the first frame member 24. The direction may be any suitable direction, and particularly a fore (F)—aft (A) direction, up (U)—down (D) direction, or left (L)—right (R) direction, including directions in the vehicle 1, as illustrated in FIGS. 10-12. Reference to substantially the same as with regard to such a direction is based on the fact that the first and second frame members 24, 26 need not be parallel to one another, but rather may converge or diverge from one another along the direction, or similarly may be arcuate curving away from and/or toward one another such that they are not parallel. The first and second frame members 24, 26 may be formed from any suitable material, including metals, such as various steel alloys and aluminum alloys, and engineering plastics, as well as various combinations or composites thereof, and may include solid frame members or hollow frame members, such as various rectangular channels or circular tubes. In one embodiment, the first frame member 24 and second frame member 26 may be portions of a continuous seat frame 22 as illustrated in FIGS. 10 and 11. In other embodiments, the first frame member 24 and second frame member 26 may be standalone portions and may not be continuous with or connected to one another.

The seat suspension 20 also includes a first spring member 28 that is attached on a first outer end 30 to the first frame member 24 and has a first inner end 32 extending inwardly toward the second frame member 26. The first spring member 28 may comprise any suitable type of spring, including a coil spring. The first spring member 28 may be attached to the first frame member 24 by any suitable attachment including a mechanical coupling where at least one of the coils of the coil spring engages an opening or feature formed into the seat frame 22, or a mechanical clamp and fastener that clamps the first spring member 28 to the seat frame 22, or by a weld joint that joins the first spring member 28 to the seat frame 22. The first spring member 28 may be made from any suitable material, including various steel alloys, particularly spring steel alloys.

The seat suspension 20 also includes a second spring member 34 disposed opposite the first spring member 28 that is attached on a second outer end 36 to the second frame member 26 and has a second inner end 38 extending inwardly toward the first frame member 24. The second spring member 34 may comprise any suitable type of spring, including a coil spring. The second spring member 34 may be attached to the second frame member 26 by any suitable attachment including a mechanical coupling where at least one of the coils of the coil spring engages an opening or feature formed into the seat frame 22, or a mechanical clamp and fastener that clamps the second spring member 34 to the seat frame 22, or by a weld joint that joins the second spring member 34 to the seat frame 22. The second spring member 34 may be made from any suitable material, including various steel alloys, particularly spring steel alloys.

In one embodiment, the first and second spring members 28, 34 may also be formed from a shape memory alloy (SMA), including the SMA materials described herein, and may also be energized with a tensioning signal (e.g. an electrical current), as described herein, to further increase the magnitude of the spring tensions described herein. The first spring member 28 and the second spring member 34 may include the same type of spring configuration and spring material or may have different spring configurations and/or spring materials.

The seat suspension 20 also includes an intermediate tensioning member 40 formed from an SMA attached to and extending between the first inner end 32 and the second inner end 38 and having a first length ($L_1$) as shown in FIG. 1 that provides a first spring tension 42, or alternately first condition, or alternately first position, of the seat suspension 20 through the first and second spring members 28, 34. The first and second spring members 28, 34 may be selected to have a predetermined size and spring rate and provide a predetermined tensioning force in conjunction with the operation of the intermediate tensioning member 40, as described herein. The intermediate tensioning member 40 is configured to alter its length to a second length ($L_2$) that is shorter than the first length ($L_1$) as shown in FIG. 2 that provides a second spring tension 44, or alternately second condition, or alternately second position, of the seat suspension 20 through the first and second spring members 28, 34 in response to application of a tensioning signal thereto. The intermediate tensioning member 40 may have any suitable shape and size, which in one embodiment includes an SMA wire 46. The intermediate tensioning member 40 may be attached to the first inner end 32 and the second inner end 38 by any suitable attachment, including any suitable mechanical or metallurgical attachment or joint, such as various mechanical clamps, crimps, swage joints, welds, and the like, configured to permanently or removably fix these members to one another sufficiently to repeatably apply and release a tensioning force to the first and second spring members 28, 34.

In one embodiment, the SMA of the intermediate tensioning member 40, such as the SMA wire 46, would be initially formed to an initial length and then be deformed to the first length ($L_1$), with the first length ($L_1$) being greater than the initial length either prior to, or in conjunction with, the formation of the seat suspension 20. The first spring tension 42 resulting in the first and second spring members 28, 34 and the intermediate tensioning member 40 at a predetermined first length ($L_1$) provides a predetermined first spring tension 42, which represents a predetermined minimum spring tension of the seat suspension 20. The seat suspension 20 may then be adjusted to a desired spring tension by application of a variable tensioning signal (e.g. current to heat the SMA wire 46 by resistive heating) to the intermediate tensioning member 40 to change the first length ($L_1$) to a variable predetermined second length ($L_2$) to provide a second spring tension 44, which at a minimum provides the second length ($L_2$) being equal to the initial length and provides a maximum second spring tension 44. Thus, the diameter of the SMA wire 46 and the selection of the SMA and its physical and mechanical metallurgical properties (e.g. modulus of elasticity, martensite and austenite transition temperatures, etc.) and the characteristics of the first and second spring members 28, 34, such as spring rate, will be selected to provide a predetermined operating range of the first and second spring tensions 42, 44 for the seat suspension 20.

As used herein, SMA may comprise any suitable SMA or SMAs, including nickel-titanium based (nitinol) alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The SMA's alloys may be binary alloys, ternary alloys, or any higher order alloys so long as the alloy composition exhibits a shape memory effect, e.g., change in shape or length as a function of current, temperature, and the like. In one embodiment, the nitinol alloy comprises Ni and Ti in substantially equal atomic percentages, and in another embodiment equal atomic percentages with the formula NiTi. In one embodiment, suitable nitinol wire is as specified in ASTM F2063.

In one embodiment, the seat suspension 20 also includes a controller 48 operatively connected to and in signal communication with the intermediate tensioning member 40. The controller 48 is configured to selectively provide the tensioning signal applied to the intermediate tensioning member 40, which in one embodiment is a selectively variable current signal that is applied through an electrical conductor, such as wire or cable 50 that is operatively connected to the intermediate tensioning member 40 and the controller 48, and is configured to provide a predetermined amount of resistive heating sufficient to cause a phase transformation within the SMA of the intermediate tensioning member 40 by exceeding a predetermined phase transformation temperature of the SMA necessary to cause it to begin to revert to its original (predeformed) shape and initial length, thereby selectively tensioning the first and second spring members 28, 34. The controller 48 may include one or more controllers, and may comprise a microcontroller(s) or microprocessor(s) or other controlling device, including an electronic control unit, such as one or more distributed vehicle control modules that are in signal communication with one another or networked via a wired communication bus, wireless communication bus, or a combination thereof. In an embodiment of controller 48 comprising an electronic control unit, such as one or more distributed vehicle control modules, the control modules may include a core comprising a microcontroller; volatile or nonvolatile memory including EERAM, ROM, and/or flash memory configured to store a table representative of the length of the intermediate tensioning member 40 as a function of applied current values, for example; inputs including a supply voltage, digital inputs, and/or analog inputs representative of a user command to adjust the seat suspension 20; outputs, including relay drivers, bridge drivers, injector drivers, and/or logic outputs; communication links; output relays configured to control application of a current through the wire or cable 50 to the intermediate tensioning member 40; and a housing. In one embodiment, the tensioning signal is variable and the second length ($L_2$) is variable, thereby providing a variable second spring tension 44 of the seat suspension 20. The controller 48 may be mounted to any suitable mounting member 49 in the motive vehicle 1 in any suitable manner. Mounting member 49 may comprises a portion of the seat 10, such as a seat bottom 11, or may comprise any another portion of the vehicle 1 such as the vehicle chassis or frame.

Figure 3:
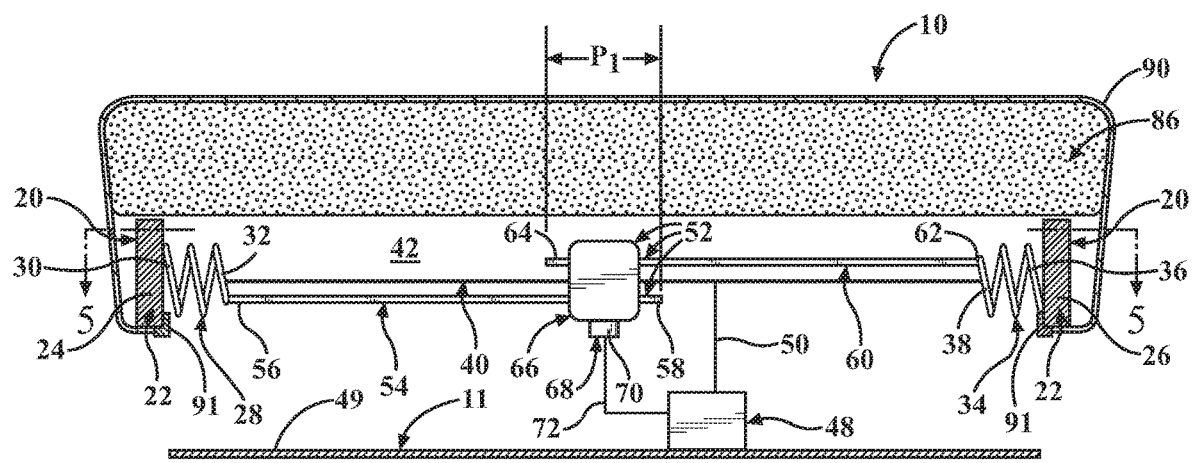
FIG. 3 is a schematic section view of a second embodiment of an adjustable firmness seat suspension in a first tension condition and a seat that includes the seat suspension, as disclosed herein.
Figure 4:
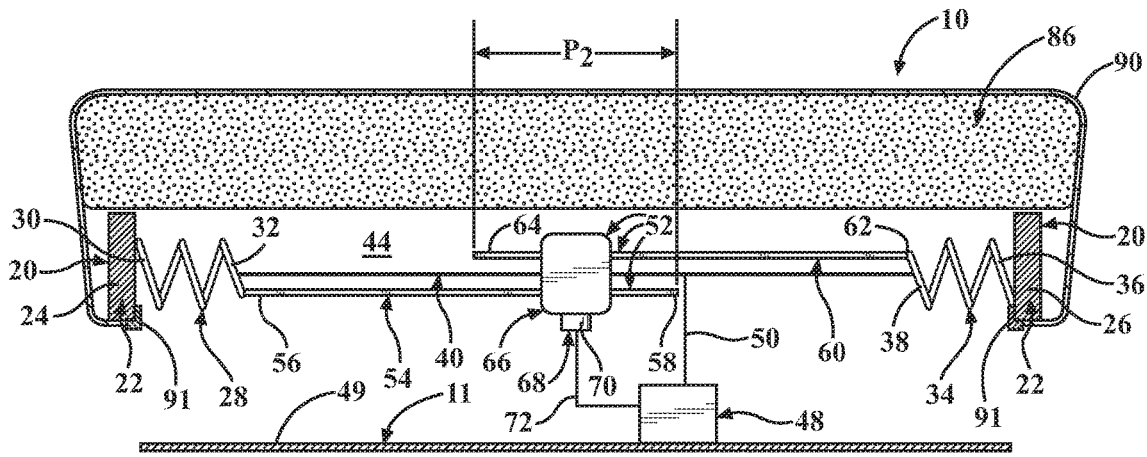
FIG. 4 is a schematic section view of the seat suspension of FIG. 3 in a second tension condition that is greater than the first tension condition.
Figure 5:
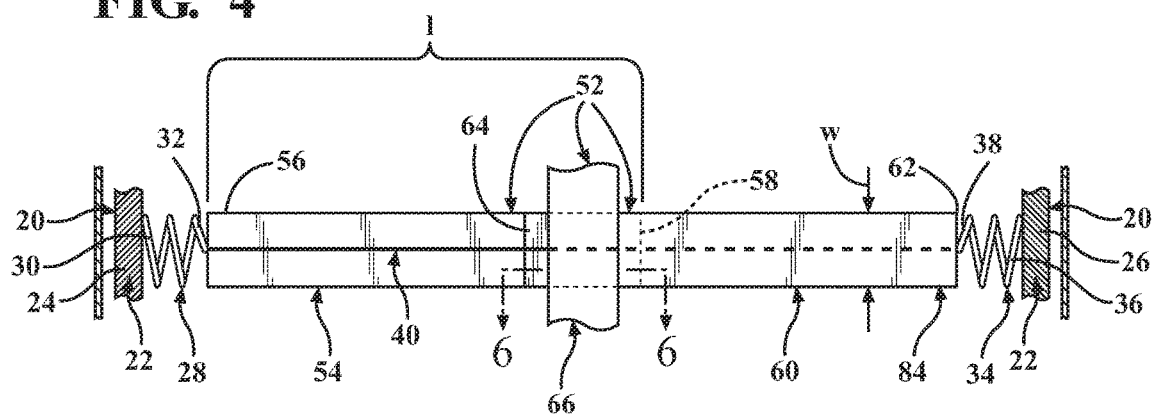
FIG. 5 is a schematic section view of the embodiment of FIG. 3 taken along Section 5--5.

As illustrated in FIGS. 3-5, in one embodiment, the seat suspension 20 also includes a locking mechanism 52 that is configured to lock the position of the seat suspension 20 and maintain a predetermined spring tension and corresponding firmness of the seat suspension 20. Any suitable seat suspension 20 locking mechanism 52 may be used. In one embodiment, the locking mechanism 52 includes a first locking member 54 having a first attachment end 56 attached to the first inner end 32 of the first spring member 28 and extending inwardly to an opposed first locking end 58. The locking mechanism 52 also includes a second locking member 60 having a second attachment end 62 attached to the second inner end 38 of the second spring member 34 and extending inwardly to an opposed second locking end 64.

The locking mechanism 52 also includes an intermediate locking member 66 disposed between the first locking member 54 and the second locking member 60 and configured to receive the first locking end 58 and the second locking end 64 in a first position ($P_1$) at the first spring tension 42 of the seat suspension 20 and in a second position ($P_2$) at the second spring tension 44 of the seat suspension 20 and configured to selectively lock or unlock the first locking end 58 and the second locking end 64 at the first position ($P_1$) or the second position ($P_2$). Unlocking allows the first locking end 58 and the second locking end 64 to slidably move through locking mechanism 52 between the first position ($P_1$) and second position ($P_2$) and between the first spring tension 42 and second spring tension 44 of the seat suspension 20, or otherwise from one position to another position and one corresponding spring tension to another spring tension of the seat suspension 20. Locking the first locking end 58 and the second locking end 64 allows the corresponding first spring tension 42, second spring tension 44 or other spring tension of the seat suspension 20 at the first position ($P_1$), second position ($P_2$) or other position, as the case may be, to be fixed by fixing the position of the first and second spring members 28, 34 to which they are attached.

As shown in FIGS. 3-5, 8, and 9, the first locking member 54 and the second locking member 60 may have any suitable shape and size. In one embodiment, as shown in FIGS. 3-5, the first locking member 54 and the second locking member 60 each comprise a substantially rectangular strip or strap shape having a length (l) and a width (w). The length (l) and width (w) may be any suitable values sufficient to span the portion of the seat suspension 20 or the seat frame 22 to which they pertain. In one embodiment, the width (w) is less than the length (l) as illustrated in FIGS. 3-5.

In another embodiment, as shown in FIGS. 8 and 9, the first locking member 54 comprises a substantially U-shaped body of any suitable size having a base portion 51 proximate the first inner end 32 of the first spring member 28 and leg portions 53 and 55 that each include first locking ends 57 and 59, respectively. Similarly, the second locking member 60 comprises a substantially U-shaped body of any suitable size having a base portion 61 proximate the second inner end 38 of the second spring member 34 and leg portions 63 and 65 that each include first locking ends 67 and 69.

The locking mechanism 52, including the first locking member 54, second locking member 60, or intermediate locking member 66 are also support members of the seat suspension 20 that, together with the first spring member 28, intermediate tensioning member 40, second spring member 34 and their associated first and second frame members 24, 26, work together as or as part of the seat suspension 20 to both support the load associated with a user while at the same time allowing the user to adjust between the first spring tension 42 and second spring tension 44 of the seat suspension 20 and other performance characteristics of the seat suspension 20 to achieve a predetermined or user selectable degree or level of firmness. The first locking member 54, second locking member 60, intermediate locking member 66 and their component elements may be formed from any suitable material, including a metal, engineering plastic, or a combination or composite thereof, that is capable of bearing a predetermined portion of the load distributed over the entire seat suspension 20, which may include users with a weight range of about 75 to about 400 lbs.

In one embodiment, the seat suspension 20 and its locking mechanism 52 also includes an actuator 68 operatively attached to the intermediate locking member 66 and configured to movably actuate the intermediate locking member 66 and selectively lock or unlock the first locking end 58 and the second locking end 64. The actuator 68 may be any suitable actuator capable of moving the intermediate locking member 66, or a component thereof, sufficiently to lock and unlock the first locking end 58 and the second locking end 64. In one embodiment, the actuator 68 includes an actuator cable, which may include an SMA actuator cable. In another embodiment, the actuator 68 may include an electrically operable solenoid 70. In one embodiment, the actuator 68 is also in signal communication with the controller 48 and is configured to movably actuate the intermediate locking member 66 and selectively lock or unlock the first locking end 58 and the second locking end 64 in response to a lock/unlock signal received from the controller 48. The lock/unlock signal may be communicated as an electrical signal, including a voltage or current, applied through a conductive control line 72, such as a conductive wire.

Any suitable mechanism or device may be employed to lock or unlock the locking mechanism 52 and its first locking end 58 and second locking end 64. As shown in FIGS. 6 and 7, in one embodiment, the first locking end 58 includes a plurality of first member locking teeth 74. In this embodiment, the second locking end 64 includes a plurality of second member locking teeth 76. In this embodiment, the intermediate locking member 66 also includes a selectively movable inner member 78 that includes first intermediate member locking teeth 80 configured to be disposed proximate to and opposing the first member locking teeth 74 and second intermediate member locking teeth 82 configured to be disposed proximate to and opposing the second member locking teeth 76. The selectively movable inner member 78 is configured to move the first intermediate member locking teeth 80 and second intermediate member locking teeth 82. The first intermediate member locking teeth 80 and first member locking teeth 74 and the second intermediate member locking teeth 82 and second member locking teeth 76 are selectively engageable and disengageable to, respectively, lock and unlock the locking mechanism 52. One or more bias springs 73 may be disposed between an interior surface of a housing 71 of the intermediate locking member 66 on an end thereof opposite an end on which the actuator 68 is disposed and the selectively movable inner member 78. In one embodiment, upon application of the tensioning signal to tension the first and second spring members 28, 34 to provide the first spring tension 42, second spring tension 44 or other predetermined spring tension, as described herein, the bias springs 73 are biased (compressed) upon the resulting actuation of the actuator 68 and movement of the selectively movable inner member 78, which is disposed within the housing 71, in response to a lock signal to lock the locking mechanism 52 in a locked position (FIG. 6). Upon cancellation of the lock signal or application of an unlock signal the bias of the compressed bias springs 73 moves the selectively movable inner member 78 downward toward the actuator 68 to disengage the first intermediate member locking teeth 80 and first member locking teeth 74 and the second intermediate member locking teeth 82 and second member locking teeth 76 and unlock the locking mechanism 52 by moving the selectively movable inner member 78 to an unlocked position (FIG. 7), thereby adjusting the seat suspension 20 by releasing the first spring tension 42, second spring tension 44 or other predetermined spring tension in the first and second spring members 28, 34. The intermediate locking member 66, housing 71, and selectively movable inner member 78 may include openings configured to receive one first locking member 54 and one second locking member 60 (FIGS. 3 and 4), or a plurality of first locking members 54 and second locking members 60 (FIGS. 8-11). In the case where the intermediate locking member 66 and housing 71 are configured to receive a plurality of first locking members 54 and second locking members 60, the selectively movable inner member 78 may comprise a single selectively movable inner member 78 or a plurality of individual selectively movable inner members 78 in one housing 71 configured to receive corresponding first locking members 54 and second locking members 60. A plurality of individual selectively movable inner members 78 may be actuated together by one actuator 68 or a plurality of actuators 68, or may be actuated individually by a plurality of actuators 68, which may be operated by the controller 48 in conjunction with the intermediate tensioning members 40 to provide a corresponding plurality of individual spring tensions, as described herein.

In one embodiment, as shown in FIG. 5, the first spring member 28, intermediate tensioning member 40, second spring member 34, first locking member 54, second locking member 60, and a portion of the intermediate locking member 66 proximate the first and second locking members 54, 60 (where the intermediate locking member 66 is configured to receive more than one first locking member 54 and more than one second locking member 60) together comprise an adjustable suspension member 84 extending in a seat suspension direction. The adjustable suspension member 84 is one of a plurality of corresponding adjustable suspension members 84 extending in the seat suspension direction. In one embodiment, the seat suspension direction is the fore-aft (F-A) direction, left-right (L-R) direction, and/or up-down (U-D) direction as shown in FIGS. 10-12.

As shown in FIGS. 10-11, in one embodiment, the controller 48 is operatively connected to and in signal communication with each of the intermediate tensioning members 40 and is configured to selectively provide the tensioning signal to each of the intermediate tensioning members 40. In another embodiment, the tensioning signal to each intermediate tensioning member 40 is variable and the second length ($L_2$) of each intermediate tensioning member 40 is variable, thereby providing a variable second spring tension 44 to each intermediate tensioning member 40 of the adjustable suspension members 84. In this embodiment, the spring tension can be varied continuously in the seat suspension direction between the first spring tension 42 and second spring tension 44. In one embodiment, the variable tensioning signal to each intermediate tensioning member 40 is the same, and the spring tension or firmness of the adjustable suspension members 84 is the same. In another embodiment, the variable tensioning signal to at least one of the plurality of intermediate tensioning members 40 is different from that to the other intermediate tensioning members 40, and the spring tension or firmness of at least one of the adjustable suspension members 84 is different from that of the others. In other embodiments, the spring tension of the adjustable suspension members 84 can be varied continuously, or discontinuously, or from member to adjacent member in the seat suspension direction. In one embodiment, the variable tensioning signals to the intermediate tensioning members 40 are individually adjusted to the preferences of an individual user and stored in the controller 48 as user-specific variable tensioning signals.

As shown in FIGS. 1-4 and 12, in one embodiment, the seat suspension 20 also includes a seat cushion 86 configured to support a user 88 that is disposed over the seat suspension 20 between the first frame member 24 and the second frame member 26. The seat cushion 86 may have any suitable configuration. In one embodiment, the seat cushion 86 may be in touching contact with the seat suspension 20, including any one or more, or all, of the elements of the seat suspension 20, including, first and second frame members 24, 26, first and second spring members 28, 34, intermediate tensioning member 40 and locking mechanism 52 or its elements as illustrated in FIGS. 1 and 2. In another embodiment, the seat cushion 86 may be disposed above the seat suspension 20 and may be configured to be deformed during use by a user 88 into touching contact with the seat suspension 20, including any one or more, or all, of the elements of the seat suspension 20, including, first and second frame members 24, 26, first and second spring members 28, 34, intermediate tensioning member 40 and locking mechanism 52 or its elements as illustrated in FIGS. 3, 4, and 12. The seat cushion 86 may include any suitable resilient material, and in one embodiment includes a polymer foam. In one embodiment, the seat suspension 20 also includes a seat cover 90 disposed over the user seat cushion 86 and the seat suspension 20. The seat cover 90 may include a textile fabric, polymer, leather, or a combination thereof. The seat cover 90 may be attached in any suitable manner to any suitable member of the vehicle 1, including any suitable portion or member of the seat 10. In one embodiment, a bottom edge 91 of the seat cover 90 is attached to the mounting member 49 as shown in FIGS. 1 and 2. In another embodiment, the bottom edge 91 of the seat cover 90 is attached to the seat frame 22, such as a bottom portion thereof, as shown in FIGS. 3 and 4.

As shown in FIGS. 1-4 and 12, in one embodiment, the seat suspension 20 is covered by the seat cushion 86 and seat cover 90 and together comprise a seat base 92, seat back 94, or both. The seat base 92, seat back 94, or both comprise the seat 10, such as the seat 10 for the vehicle 1. Alternately, as shown in FIG. 12, the seat suspension 20 is covered by the seat cushion 86 and seat cover 90 and together comprise a portion of the seat base 92, such as a thigh support 96, or a portion of a seat back 94, such as a lumbar support 98, or both.

The terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). Furthermore, unless otherwise limited all ranges disclosed herein are inclusive and combinable (e.g., ranges of "up to about 25 weight percent (wt. %), more particularly about 5 wt. % to about 20 wt. % and even more particularly about 10 wt. % to about 15 wt. %" are inclusive of the endpoints and all intermediate values of the ranges, e.g., "about 5 wt. % to about 25 wt. %, about 5 wt. % to about 15 wt. %", etc.). The use of "about" in conjunction with a listing of items is applied to all of the listed items, and in conjunction with a range to both endpoints of the range. Finally, unless defined otherwise, technical and scientific terms used herein have the same meaning as is commonly understood by one of skill in the art to which this invention belongs. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

It is to be understood that the use of "comprising" in conjunction with the components or elements described herein specifically discloses and includes the embodiments that "consist essentially of" the named components (i.e., contain the named components and no other components that significantly adversely affect the basic and novel features disclosed), and embodiments that "consist of" the named components (i.e., contain only the named components).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An adjustable firmness seat suspension, comprising:
   a seat frame comprising a first frame member and a second frame member spaced apart from and opposite one another;
   a first spring member attached to the first frame member;
   a second spring member attached to the second frame member; and
   an intermediate tensioning member attached to and extending between the first and second spring members, the intermediate tensioning member formed from a shape memory alloy (SMA) having a first length that provides a first spring tension of the seat suspension through the first and second spring members, and configured to alter its length to a second length that provides a second spring tension of the seat suspension through the first and second spring members in response to application of a tensioning signal thereto.

2. The adjustable firmness seat suspension of claim 1, further comprising a controller operatively connected to and in signal communication with the intermediate tensioning member, the controller configured to selectively provide the tensioning signal.

3. The adjustable firmness seat suspension of claim 2, wherein the tensioning signal is variable, and the second length is variable, thereby providing a variable second spring tension of the seat suspension.

4. The adjustable firmness seat suspension of claim 2, further comprising a locking mechanism.

5. The adjustable firmness seat suspension of claim 4, wherein the locking mechanism comprises:
   a first locking member having a first attachment end attached to the first spring member and extending inwardly to an opposed first locking end;
   a second locking member having a second attachment end attached to the second spring member and extending inwardly to an opposed second locking end;
   an intermediate locking member disposed between the first locking member and the second locking member, the intermediate locking member configured to receive the first locking end and the second locking end in a first position at the first spring tension of the seat suspension and in a second position at the second spring tension of the seat suspension, and selectively lock or unlock the first locking end and the second locking end at the first position or the second position; and
   an actuator operatively attached to the intermediate locking member and in signal communication with the controller, the actuator configured to movably actuate the intermediate locking member and selectively lock or unlock the first locking end and the second locking end in response to a lock/unlock signal received from the controller.

6. The adjustable firmness seat suspension of claim 5, wherein the first locking end comprises a plurality of first member locking teeth, the second locking end comprises a plurality of second member locking teeth, and the intermediate locking member comprises a selectively movable inner member comprising first intermediate member locking teeth disposed proximate and opposing the first member locking teeth and second intermediate member locking teeth disposed proximate and opposing the second member locking teeth, and wherein the selectively movable inner member is configured to move the first intermediate member locking teeth and first member locking teeth and the second intermediate member locking teeth and second member locking teeth for selective engagement and disengagement to, respectively, lock and unlock the locking mechanism.

7. The adjustable firmness seat suspension of claim 5, wherein the intermediate locking member is configured to receive another first locking member and another second locking member, the first spring member, the intermediate tensioning member, the second spring member, the first locking member, the second locking member and a portion of the intermediate locking member proximate the first and second locking members together comprise an adjustable suspension member extending in a seat suspension direction, and the adjustable suspension member is one of a plurality of corresponding adjustable suspension members extending in the seat suspension direction.

8. The adjustable firmness seat suspension of claim 7, wherein the seat suspension direction is fore-aft, left-right, or up-down.

9. The adjustable firmness seat suspension of claim 7, wherein the controller is operatively connected to and in signal communication with each intermediate tensioning member of the adjustable suspension members, and configured to selectively provide a tensioning signal to each intermediate tensioning member.

10. The adjustable firmness seat suspension of claim 9, wherein the tensioning signal to each intermediate tensioning member is variable and the second length of each intermediate tensioning member is variable, thereby providing a variable second spring tension to each intermediate tensioning member.

11. The adjustable firmness seat suspension of claim 10, wherein the variable tensioning signal to each intermediate tensioning member is the same.

12. The adjustable firmness seat suspension of claim 10, wherein the variable tensioning signal to at least one intermediate tensioning member is different from the variable tensioning signals to the other intermediate tensioning members.

13. The adjustable firmness seat suspension of claim 10, wherein the variable tensioning signals to the intermediate tensioning members are individually adjusted to a user and stored in the controller as user-specific variable tensioning signals.

14. The adjustable firmness seat suspension of claim 1, further comprising a user seat cushion disposed over the seat suspension between the first frame member and the second frame member.

15. The adjustable firmness seat suspension of claim 14, further comprising a seat cover disposed over the user seat cushion and the seat suspension.

16. The adjustable firmness seat suspension of claim 1, wherein the seat frame is disposed in and comprises a seat base, seat back, or both, and wherein the seat base, seat back, or both comprise a seat.

17. The adjustable firmness seat suspension of claim 1, wherein the SMA comprises nitinol.

18. A vehicle seat, comprising:
a seat base, seat back, or both, comprising:
an adjustable firmness seat suspension, comprising:
a seat frame comprising a first frame member and a second frame member spaced apart from and opposite one another;
a plurality of first spring members attached to the first frame member;
a plurality of second spring members attached to the second frame member; and
a plurality of intermediate tensioning members each attached to and extending between a respective pair of first and second spring members, each intermediate tensioning member formed from a shape memory alloy (SMA) having a first length that provides at least part of a first spring tension of the seat suspension, and configured to alter its length to a second length that provides at least part of a second spring tension of the seat suspension in response to application of a tensioning signal thereto;
a user seat cushion disposed over the seat suspension between the first frame member and the second frame member; and
a seat cover disposed over the user seat cushion and the seat suspension.

19. The seat of claim 18, further comprising a controller operatively connected to and in signal communication with the intermediate tensioning members, the controller configured to selectively provide the tensioning signals.

20. The seat of claim 19, further comprising a locking mechanism corresponding to at least one intermediate tensioning member and a respective pair of first and second spring members, the locking mechanism comprising:
a first locking member having a first attachment end attached to the first spring member and extending inwardly to an opposed first locking end;
a second locking member having a second attachment end attached to the second spring member and extending inwardly to an opposed second locking end;
an intermediate locking member disposed between the first locking member and the second locking member, the intermediate locking member configured to receive the first locking end and the second locking end in a first position at the first spring tension of the seat suspension and in a second position at the second spring tension of the seat suspension, and selectively lock or unlock the first locking end and the second locking end at the first position or the second position; and
an actuator operatively attached to the intermediate locking member and in signal communication with the controller, the actuator configured to movably actuate the intermediate locking member and selectively lock or unlock the first locking end and the second locking end in response to a lock/unlock signal received from the controller.

* * * * *

UNITED STATES PATENT AND TRADEMARK OFFICE
CERTIFICATE OF CORRECTION

PATENT NO. : 10,532,672 B1
APPLICATION NO. : 16/026522
DATED : January 14, 2020
INVENTOR(S) : Pinkelman et al.

Page 1 of 1

It is certified that error appears in the above-identified patent and that said Letters Patent is hereby corrected as shown below:

In the Specification
    Column 7, Line 48: replace two instances of "length (1)" with --length (l)--
    Column 7, Line 52: replace "length (1)" with --length (l)--

Signed and Sealed this
Twenty-fourth Day of March, 2020

Andrei Iancu
*Director of the United States Patent and Trademark Office*